Oct. 23, 1934.  L. E. NELSON  1,978,276
EYEGLASSES
Filed Sept. 26, 1932  3 Sheets-Sheet 2
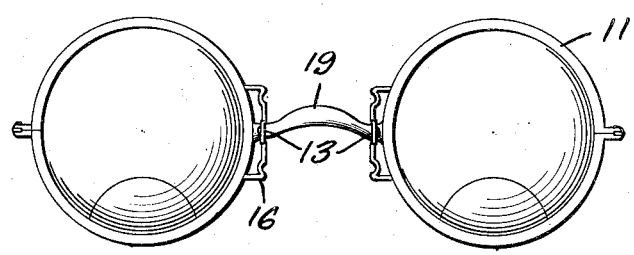
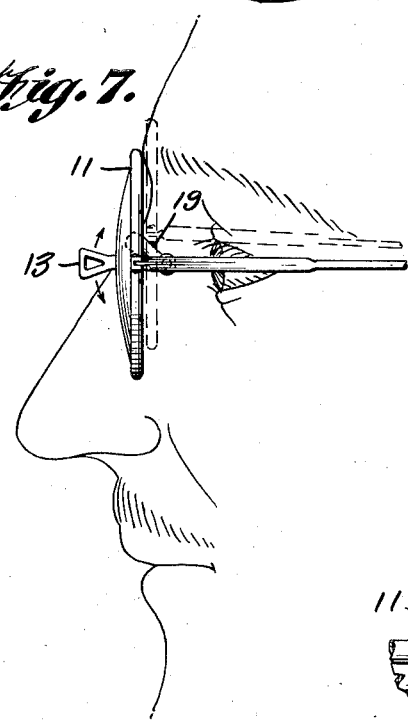
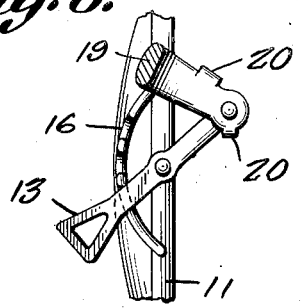
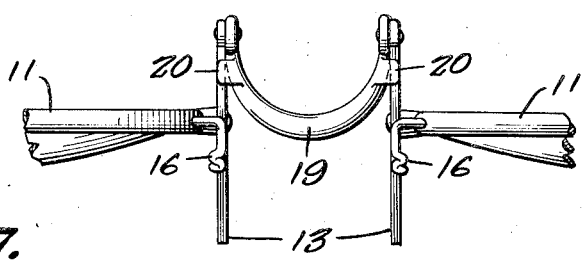
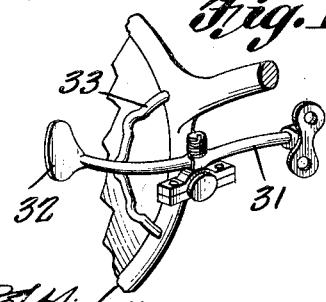
Lester E. Nelson,
INVENTOR Oct. 23, 1934.　　　　L. E. NELSON　　　　1,978,276
EYEGLASSES
Filed Sept. 26, 1932　　　3 Sheets-Sheet 3
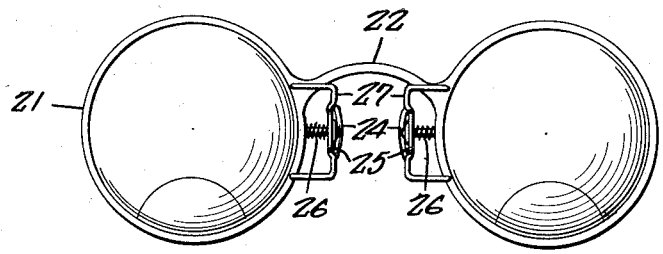
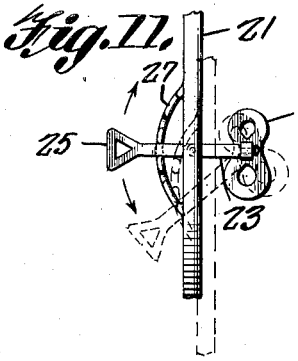
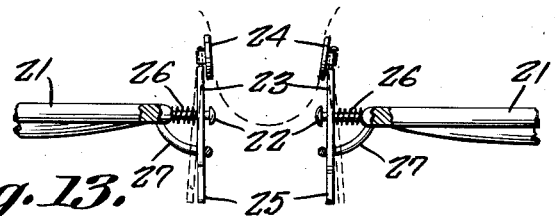
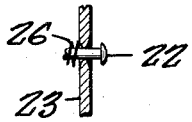
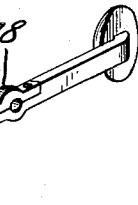
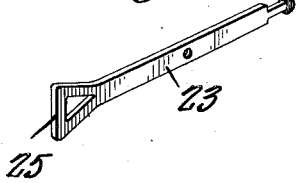
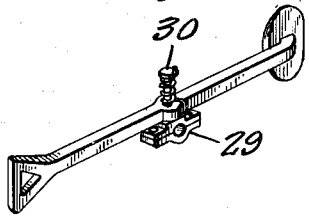
Lester E. Nelson,
INVENTOR Patented Oct. 23, 1934

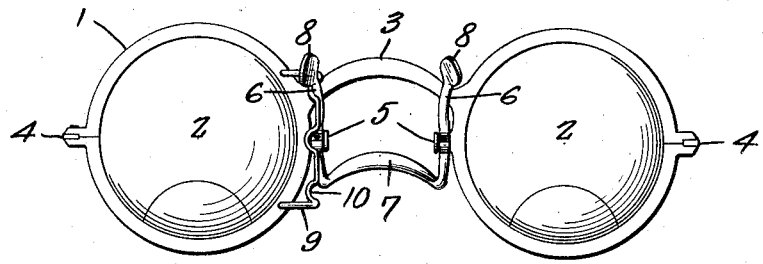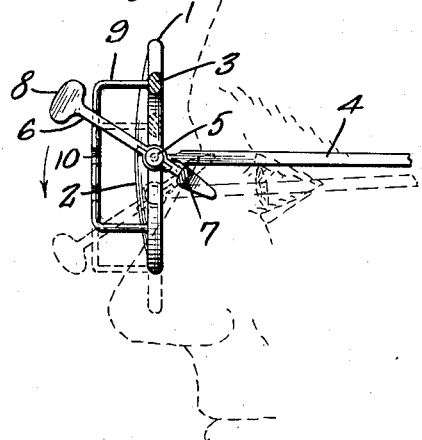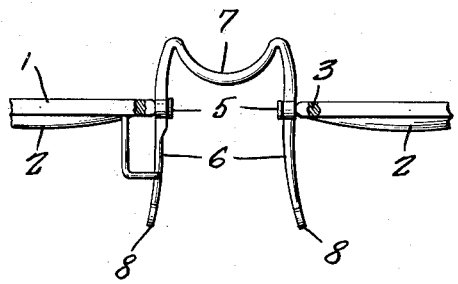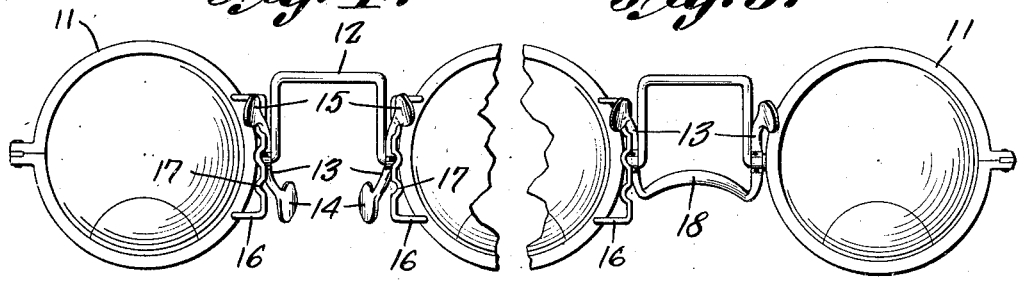

1,978,276

UNITED STATES PATENT OFFICE 1,978,276

EYEGLASSES

Lester E. Nelson, Minneapolis, Minn.

Application September 26, 1932, Serial No. 634,971

2 Claims. (Cl. 88—50)

This invention relates to eyeglass frames adapted especially for bifocal lenses, and has for the primary object, the provision of means whereby the bifocal lenses may be easily and quickly adjusted to a position relative to a person's normal line of vision to obviate the necessity of strained positions of the head and eyes of a person when looking through the lenses and particularly the reading portions of the lenses.

Another object of this invention is the provision of adjusting means applicable to either the type of frames worn directly on the nose of a person or the spectacle frame employing the temple bars engageable with the ears of a person so that bifocal lenses when carried by either type of frame may be readily adjusted relative to the normal line of vision of the person.

With these and other objects in view this invention consists in certain novel features of construction, combination and arrangemet of parts to be hereinafter more fully described and claimed.

For a complete understanding of my invention, reference is to be had to the following description and accompanying drawings, in which Figure 1 is a front elevation illustrating a spectacle frame for bifocal lenses constructed in accordance with my invention.

Figure 2 is a side elevation partly in section illustrating the same.

Figure 3 is a fragmentary sectional view illustrating the adjusting means for varying the position of the bifocal lenses with respect to the normal line of vision of the person.

Figure 4 is a fragmentary front elevation illustrating a modified form of my invention.

Figure 5 is a similar view showing another modified form of my invention.

Figure 6 is a front elevation illustrating another modified form of my invention.

Figure 7 is a side elevation illustrating the form of invention shown in Figure 6 applied to a person.

Figure 8 is a fragmentary sectional view illustrating the adjusting means of the form of invention shown in Figures 6 and 7.

Figure 9 is a fragmentary plan view of the form of invention shown in Figures 6 to 8.

Figure 10 is a front elevation illustrating the adjusting means applied to the nose type of frame.

Figure 11 is a fragmentary side elevation illustrating the form of invention shown in Figure 10.

Figure 12 is a fragmentary plan view partly in section illustrating the type of device shown in Figures 10 and 11.

Figure 13 is a detail sectional view illustrating a pivot for the adjusting bar in the form of my invention shown in Figures 10 and 12.

Figure 14 is a perspective view illustrating the adjusting bar.

Figure 15 is a similar view showing a modified form of adjusting bar.

Figure 16 is a perspective view illustrating another modified form of adjusting bar in its mounting.

Figure 17 is a perspective view illustrating another modified form of adjusting bar and its mounting.

Referring in detail to the drawings, the numeral 1 indicates lens frames supporting bifocal lenses 2 and connected by a bridge bar 3. The frames 1 have the usual temple bars 4. The frame 1, adjacent the bridge bar 3 are provided with journals 5 to which adjusting bars or arms 6 are journaled and the latter are connected at one end by a nose bridge 7 engageable with the nose of a person when the glasses are applied by engaging the temple bars 4 with the ears of a person. The free ends of the adjusting bars 6 extend forwardly of the frames 1 and are flattened to form finger pieces 8.

A latch bar or member 9 is carried by one of the frames and is provided with spaced notches 10, any one of which is to be engaged by one of the adjusting bars 6.

The full line position of the frames and associated parts, as shown in Figure 2, are to position the frames in their uppermost position with respect to the normal line of vision of a person's eyes, allowing the person to see through the reading portions of the lenses without assuming an unnatural position of the head. When desiring to look through the reading portions of the lenses the adjusting arms are swung downwardly into engagement with the lowermost notch of the elements 9, as shown in dotted lines in Figure 2, bringing that portion of the lenses in alinement with the normal vision of the person's eyes.

Referring to the form of my invention shown in Figure 4, the frames 11 carrying the bifocal lenses are connected by a bridge 12 on which are journaled adjusting bars 13 and the inner ends thereof are flattened, as shown at 14, to form nose rests engageable with the opposite sides of a person's nose while the outer ends of the bars are flattened to form finger pieces 15. The frames 11 carry brackets or members 16 provided with spaced notches or offset portions 17 to be engaged by the bars for the purpose of adjusting the position of the lenses with respect to the normal line of vision of the person.

Referring to my form of invention as shown in Figure 5, the construction thereof is similar to that shown in Figure 4, except the inner ends of the bars 13 are connected by a nose bridge 18 and only one of the frames is equipped with a bracket or member 16.

Referring to Figures 6 to 9 illustrating another modified form of my invention, this form is similar to that shown in Figure 5, excepting the bridge 19 is pivoted to the inner ends of the adjusting bars 13 and the nose piece is provided with lugs or stops 20 for limiting the pivotal movement of the nose piece with respect to the bars.

Referring to the form of my invention shown in Figures 10 to 13, inclusive, the frames 21 carrying the bifocal lenses are connected by a bridge 22 and have the usual temple bars eliminated therefrom.

Pivot pins 22' are carried by the frames 21 adjacent the bridge 22 and have journaled thereon adjusting bars 23, carrying at their inner ends nose engaging elements 24, while their outer ends are enlarged to form finger pieces 25. Expansion springs 26 are mounted on the pivots 22' between the frames 21 and the adjusting bars 23 for urging the latter toward each other to cause gripping of the nose when applied thereto. Brackets 27 are carried by the frames 21 and overlie the opposing faces of the adjusting bars and provided with spaced notches so that the springs 26 urge the adjusting bars in a direction to engage with the notches. The openings within the adjusting bars are of such a size and shape as shown in Figure 13 to permit a limited lateral movement of the adjusting bars in order to disengage them from the notches of the brackets 27 to bring about the adjustment of the lenses with respect to the normal line of vision of the person.

The nose engaging elements 24 may be of various shapes, as shown in the drawings and are pivotally connected to the inner ends of the adjusting bars.

If desired as shown in Figure 15, the adjusting bars may be constructed to have a removable bearing section 28 to permit the bars to be readily applied to the pivots 22'.

As shown in Figure 16 a sectional bar 29 may be provided for receiving the pivot pin 22' and carries a pivot pin 30 on which is journaled the adjusting bar. A coil spring is secured to the pin 30 and engages the adjusting bar for urging the latter or the nose engaging element thereof into engagement with the side of the nose. Thus it will be seen that this form of means of mounting the adjusting bar permits the latter to be swung laterally or in an upward or downward direction with respect to the frames 21.

The form of the invention shown in Figure 17 is similar to that shown in Figure 16, except the adjusting bar 31 has its outer end carrying the finger piece 32 curved laterally and is engageable with a notched bracket 33 carried by the frame.

While the adjusting bars and associated parts are shown in the drawings of comparatively large size in proportion to the frames, it is to be understood that in reality or in the reduction of this invention to practice these parts will be constructed on a very much smaller scale so as to provide neatness and compactness of the device.

While I have shown and described the preferred embodiment of my invention, it will be understood that minor changes in construction, combination and arrangement of parts may be made without departing from the spirit and scope of my invention, as claimed.

Having described the invention, I claim:

1. In combination with connected lens frames, pivots on said frames, adjusting bars rotatably and pivotally mounted on the pivots to grip the nose of a person, means on said frames to be engaged by the bars for retaining the latter in various adjusted positions, and spring means normally urging the bars to grip the nose and to position said bars in engagement with said first means.

2. In combination with connected lens frames, opposing pivots on said frames, adjusting bars rotatably and pivotally mounted on the pivots to grip the nose of a person, brackets secured to the frames and having notches to receive said bars for holding the latter in adjusted positions, spring means normally urging the bars to grip the nose of a person and to position said bars in engagement with the notches of the said brackets.

LESTER E. NELSON.